(12) United States Patent
Kojima

(10) Patent No.: US 10,124,396 B2
(45) Date of Patent: *Nov. 13, 2018

(54) MIXING ELEMENT AND METHOD FOR MANUFACTURING THE SAME

(71) Applicant: MU COMPANY LTD., Tokyo (JP)

(72) Inventor: Hisao Kojima, Yokohama (JP)

(73) Assignee: MU COMPANY LTD., Tokyo (JP)

( * ) Notice: Subject to any disclaimer, the term of this patent is extended or adjusted under 35 U.S.C. 154(b) by 59 days.

This patent is subject to a terminal disclaimer.

(21) Appl. No.: 15/195,360

(22) Filed: Jun. 28, 2016

(65) Prior Publication Data

US 2016/0339403 A1 Nov. 24, 2016

Related U.S. Application Data

(63) Continuation-in-part of application No. 15/087,500, filed on Mar. 31, 2016.

(30) Foreign Application Priority Data

Apr. 3, 2015 (JP) ................................. 2015-087104

(51) Int. Cl.
*B21J 13/02* (2006.01)
*B01F 5/06* (2006.01)
*B01F 3/04* (2006.01)
*B23K 26/38* (2014.01)

(52) U.S. Cl.
CPC ........... *B21J 13/02* (2013.01); *B01F 3/04517* (2013.01); *B01F 5/0615* (2013.01); *B23K 26/38* (2013.01); *B01F 2005/0636* (2013.01)

(58) Field of Classification Search
USPC .................................................. 366/293, 280
See application file for complete search history.

(56) References Cited

U.S. PATENT DOCUMENTS

| | | |
|---|---|---|
| 2,838,178 A | 6/1958 | Bankes |
| 4,049,241 A | 9/1977 | Taniguchi |
| 4,259,024 A | 3/1981 | Clasen et al. |
| 5,525,242 A | 6/1996 | Kerecz |
| 5,632,962 A | 5/1997 | Baker et al. |
| 6,361,202 B1 | 3/2002 | Lee et al. |
| 6,431,528 B1 | 8/2002 | Kojima |

(Continued)

FOREIGN PATENT DOCUMENTS

JP 2011-067819 A 4/2011

OTHER PUBLICATIONS

Oct. 12, 2017 Office Action Issued in U.S. Appl. No. 15/087,500.
Mar. 9, 2018 Office Action issued in U.S. Appl. No. 15/087,500.

*Primary Examiner* — Mark Halpern
(74) *Attorney, Agent, or Firm* — Oliff PLC

(57) ABSTRACT

A mixing element in which spiral blade edge portions are disposed in a tube wall portion of a passage tube through which fluid flows and an opening section of the passage tube and the blade edge portions are joined to each other is provided. In an existing manufacturing method using a gas welding machine, when, for example, a mixing element having an inside diameter of 130 mm is to be manufactured, eight 90-degree rotation type spiral blades can be disposed at most. In a method for manufacturing the mixing element according to the present invention, it is possible to manufacture a mixing element including 10 or more blades by using a laser processor.

2 Claims, 5 Drawing Sheets

(56) References Cited

U.S. PATENT DOCUMENTS

| | | |
|---|---|---|
| 6,451,208 B1 | 9/2002 | Ledoux |
| 6,797,181 B2 | 9/2004 | Morse et al. |
| 6,913,382 B2 | 7/2005 | Ledoux |
| 7,510,172 B2 | 3/2009 | Kojima |
| 2016/0288067 A1* | 10/2016 | Kojima ................ B23K 26/38 |

* cited by examiner

MIXING ELEMENT AND METHOD FOR MANUFACTURING THE SAME

BACKGROUND OF THE INVENTION

1. Field of the Invention

The present invention relates to a mixing element that mixes/agitates two or more types of fluids by using fluid energy of the fluids, and a method for manufacturing the same. The mixing element is used as a mixing/agitating device that does not need power for mixing/agitating a gas and a liquid, a gas and a gas, a liquid and a liquid, etc.

2. Description of the Related Art

In an existing mixing element (Japanese Unexamined Patent Application Publication No. 2011-067819), a cylindrical passage tube and a plurality of spiral blades are joined to each other at an inner wall portion of the passage tube. Therefore, when the inner wall portion of the passage tube and the blades are joined by a welding unit, intervals between adjacent blades are restricted by the size of a welding torch. Consequently, there is a limit as to how fine the intervals between adjacent blades can be made. By making the intervals into fine intervals, a ratio ($m^2/m^3$) of a total surface area ($m^2$) of the blades per unit volume ($m^3$) of the mixing element is increased, so that fluid mixing efficiency is increased.

However, as a result of the intervals being restricted by the size of a welding tool, in a narrow space, it is considerably difficult to weld the blades to the inner wall portion of the tube. Therefore, there has been a demand for a mixing element having high mixing efficiency per unit volume.

SUMMARY OF THE INVENTION

It is an object of the present invention to provide a high-performance mixing element which has a simple structure, which is easy to manufacture, and whose manufacturing costs can be made low; and a method for manufacturing the mixing element.

In order to solve the above-described problem and achieve the object of the present invention, a mixing element is manufactured by disposing blade edge portions of spiral blades of leftward rotation or rightward rotation in a plurality of opening sections of a tube wall portion of a cylindrical passage tube, and joining the opening sections of the passage tube and the blade edge portions to each other.

DESCRIPTION OF THE PREFERRED EMBODIMENT

A mixing element 1 according to an embodiment of the present invention is hereunder described with reference to the drawings. However, the present invention is not limited to the embodiment below.

Figure 1:
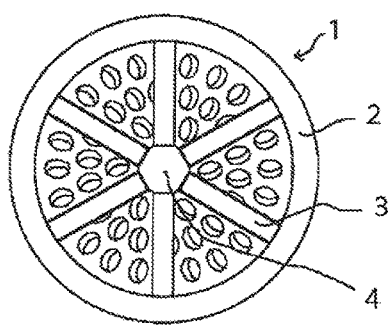
FIG. 1 is a plan view of a mixing element according to an embodiment of the present invention.

FIG. 1 is a plan view of the mixing element 1 according to the embodiment of the present invention. As shown in FIG. 1, the mixing element 1 according to the embodiment includes a cylindrical passage tube 2, a plurality of spiral blades 3 that are twisted by 90 degrees in a rightward direction, and an opening portion 4 in a central portion of the mixing element 1. The opening portion 4 is formed over the entire length of the blades 3 in an axial direction. The blades 3 are each formed from a porous plate having a plurality of perforations.

Figure 2:
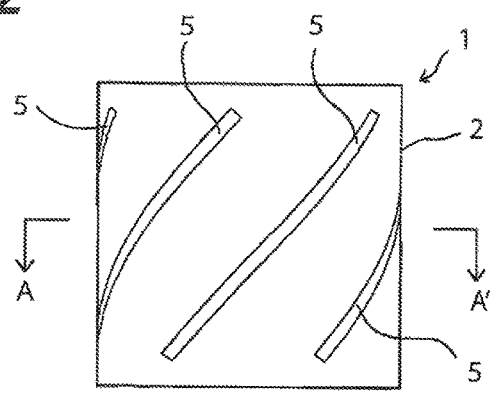
FIG. 2 is a front view of the mixing element according to the embodiment of the present invention.

FIG. 2 is a front view of the mixing element 1 according to the embodiment of the present invention. In the mixing element 1, the cylindrical passage tube 2 and the spiral blades 3 that are disposed from an outer side of the passage tube 2 are joined to each other at opening sections by, for example, welding, bonding, or deposition. Here, the term "blade edge portions 5" refers to outer peripheral portions of the blades 3 that are spirally formed downward in an axial direction of the mixing element 1. This is described in detail with reference to FIGS. 3 and 4. The method for disposing the blades 3 is not limited to the aforementioned method. The blades 3 may be disposed from an inner side of the passage tube 2.

A blade according to the present invention is produced by the following steps of forming a fan-shaped blade by a cutting operation by using a laser processor on the basis of a development showing a fan shape of the blade, a perforation of the blade, and a perforation position on the blade; forming the blade cut into the fan shape into a spiral blade by using a mold; forming an opening section in a tube wall portion of a passage tube by the laser processor so as to have substantially the same shape as a spiral blade edge portion of the blade; disposing the spiral blade in the opening section of the tube wall portion of the passage tube; and joining the opening section of the passage tube and the blade edge portion by the laser processor. By successively performing these steps, a mixing element is manufactured.

The mold is a forging mold. Spiral blades are manufactured by using an uneven forging mold. This makes it possible to manufacture precise blades of high quality at a low cost. The mold is selectively used as appropriate in accordance with the material of the mixing element 1. The mold and the blades may be heated when necessary.

When used as a static mixer, one or more of the mixing elements 1 according to the present invention may be disposed in series and used. The directions of flow of fluids are a parallel flow direction and a counterflow direction. The fluids are such that a spiral flow along the spirals of the blades 3, a straight flow through the opening portion 4, and a divided flow through the perforated porous plates merge. The fluids are continuously divided, rotated, and sheared, and are mixed by flow energy of the fluids.

As a method for increasing mixing effect, means for increasing the packing density m$^2$/m$^3$ of the blades (that is, the total surface area of the blades divided by the volume of the element) may be used. By disposing many blades 3 (10, 12, 16, 18, 20, 24, . . . n blades) in the mixing element 1, the packing density (m$^2$/m$^3$) of the blades is increased. As a result, mixing efficiency is increased.

Figure 3:
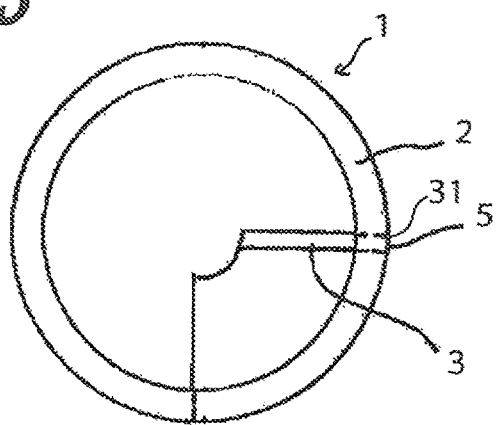
FIG. 3 is a partial explanatory plan view of the mixing element according to the embodiment of the present invention.

FIG. 3 is a partial explanatory plan view of the mixing element 1 and one blade 3 according to the embodiment of the present invention. The blade 3 is formed from a porous plate. An opening section 32 is formed in the tube wall portion of the cylindrical passage tube 2. The opening section 32 has a plurality of openings 31 having substantially the same shape as the blade edge portion 5.

Figure 4:
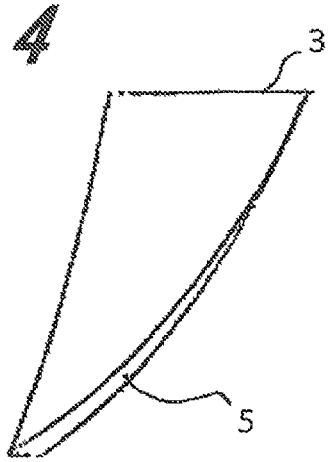
FIG. 4 is a front view of one blade of the mixing element according to the embodiment of the present invention.

FIG. 4 is a front view of one blade 3. One 90-degree rightward rotation type blade 3 is disposed in the opening section. The blade edge portion 5 of the blade 3 is disposed so as to extend through the tube wall portion of the passage tube 2. The passage tube 2 and the blade edge portion 5 are joined to each other at the opening section of the passage tube 2. These operation steps are successively repeated to join the required number of blades.

Figure 5:
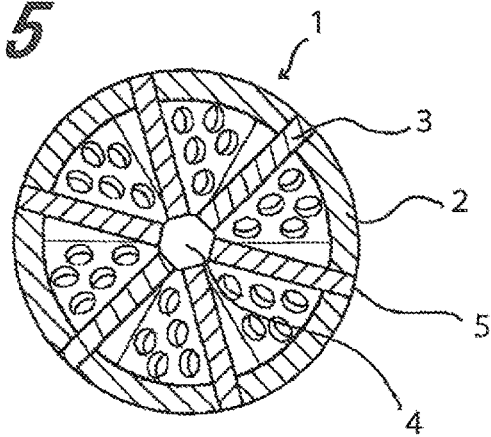
FIG. 5 is a sectional view taken along line A-A' in a front view of the mixing element according to the embodiment of the present invention.

FIG. 5 is a sectional view taken along line A-A' in a front view of the mixing element 1 according to the embodiment of the present invention. The mixing element 1 includes the cylindrical passage tube 2, the plurality of spiral blades 3 formed from spiral porous bodies, and the opening portion 4 that, at the central portion of the mixing element 1, opens along the entire length of the blades 3 in the axial direction.

The blade edge portions 5 are disposed in the opening sections of the of the passage tube 2. The passage tube 2 and the blade edge portions 5 are joined to each other by welding, bonding, deposition, or other processing means. By this joining method, the passage tube 2 and the blade edge portions 5 are easily welded to each other without being influenced by the shape of a welding torch of a welding machine. As a result, it is possible to easily increase the packing density (m$^2$/m$^3$) of the blades 3 in the mixing element 1.

Figure 6:
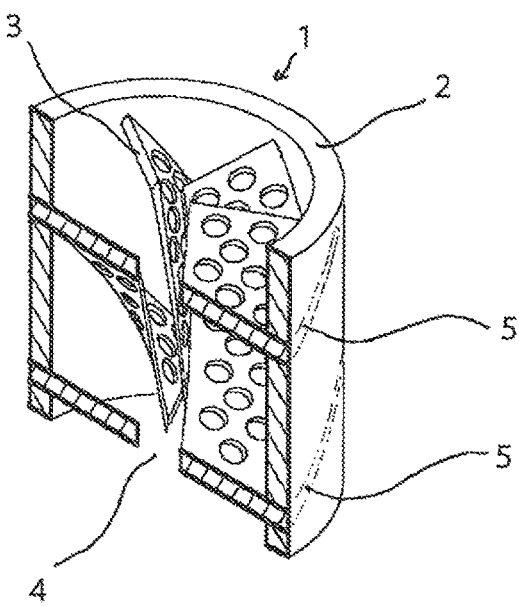
FIG. 6 is a vertical sectional perspective view of a center in a right side view of the mixing element according to the embodiment of the present invention.

FIG. 6 is a vertical sectional perspective view of a center in a right side view of the mixing element 1 according to the embodiment of the present invention. The mixing element 1 includes the cylindrical passage tube 2, the plurality of spiral blades 3 of rightward rotation, and the opening portion 4 in a central portion of the blades 3. The blade edge portions 5 are disposed over the entire length of the opening sections of the passage tube 2. The passage tube 2 and the plurality of blade edge portions 5 are joined to each other as described above. The direction of rotation of the blades 3 of the mixing element 1, the number of blades 3 of the mixing element 1, the perforation diameter, the aperture ratio, method of arrangement, etc. can be selected as appropriate.

The shape of the perforations of the blades is selected in accordance with the purpose of use from the following shapes, such as a circular shape, an elliptical shape, a segmental shape, a fan shape, a triangular shape, a square shape, a rectangular shape, a trapezoidal shape, and an equicircular polygonal shape.

In the mixing element 1 according to the present invention, the passage tube 2 and the blades 3 are easily joined to each other. Therefore, it is possible to manufacture at a low cost the mixing element 1 having a high packing density (m$^2$/m$^3$) of the blades 3 that contribute to mixing efficiency. The mixing element 1 can be used in all fields requiring mixing. The mixing element 1 is applicable to, for example, a wastewater treatment device, an exhaust gas treatment device, a gas absorbing/dissolving device, a flotation separation device, a gas-liquid reactor, and a fuel combustion device. Further, the mixing element 1 is applicable as packing in a distillation column.

Figure 7:
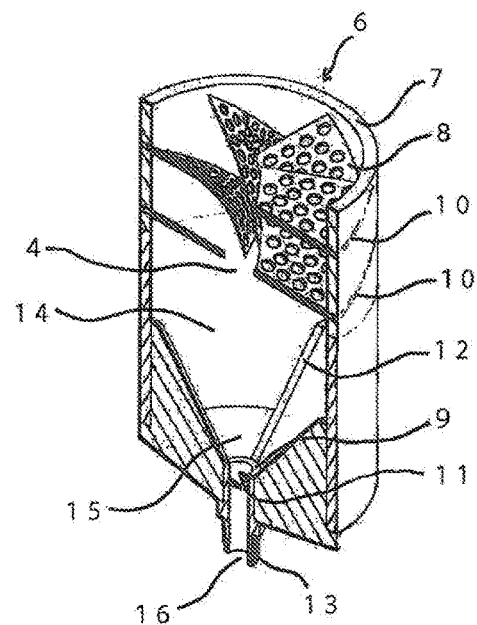
FIG. 7 is a vertical sectional perspective view of a center in a right side view of a static gas-liquid mixer, which is an application product of the mixing element according to the embodiment of the present invention.

FIG. 7 is a vertical sectional perspective view of a center in a right side view of a static gas-liquid mixer 6 including the mixing element 1 according to the embodiment of the present invention and an injection nozzle 9 where spiral blades 8 of rightward rotation are disposed.

The static gas-liquid mixer 6, which is an application product according to the present invention, includes, as primary elements, a cylindrical passage tube 7 through which a gas-liquid multiphase flow moves, the plurality of spiral blades 8 at an upper portion of the passage tube 7, and the injection nozzle 9 for injecting gas at a lower portion of the passage tube 7.

The static gas-liquid mixer 6 is formed by joining the passage tube 7 and blade edge portions of the spiral blades 8 at the upper portion in the passage tube. A top portion of the injection nozzle 9 is formed by disposing a plurality of spiral blades 11. Each spiral blade in the passage tube 7 is formed from a porous body having many perforations. The passage tube 7 and the injection nozzle 9 are supported by joining a plurality of supporting ribs 12 thereto. A gas supplying portion of the injection nozzle 9 is formed from a threaded portion 13. It is possible to, with gas branching from one gas supplying portion 16, dispose a plurality of the injection nozzles 9 side by side.

A space portion 14 is formed by disposing lower end portions of the blades 8 at the passage tube 7 and an upper end portion of the injection nozzle 9 apart from each other. A plurality of liquid introducing portions 15 that introduce surrounding liquid are formed below the space portion 14. Gas that is injected from the injection nozzle 9 and liquid that is introduced from the plurality of liquid introducing portions 15 merge at the space portion 14, and generate a multiphase flow.

When the static gas-liquid mixer 6, which is an application product according to the present invention, is used as a diffusing cylinder, in a method of use, the diffusing cylinder is disposed at a bottom portion of an aeration tank, and pressurized gas is injected into the space portion 14 through the blades 11 that internally contact the injection nozzle 9. It is desirable that the injection speed of the gas be in the range of 5 to 500 m/sec. Injection flow of the gas that is injected at a high speed includes a spiral flow along the spiral blades 11 and a straight flow along a central portion of the plurality of blades 11. Oscillation phenomena is stimulated.

Further, by an air lift effect that occurs due to the injection flow of the pressurized gas that is injected upward at a high speed from the injection nozzle 9, surrounding liquid is introduced into the space portion 14 in the passage tube 7 from the liquid introducing portions 15. In the space portion 14, the gas and the liquid generate a gas-liquid multiphase flow. Then, while the gas-liquid multiphase flow moves in parallel upward, as a result of division, rotation, merging, and shearing action and the oscillation phenomenon of excited gas, the gas-liquid multiphase flow is mixed/agitated and refined, so that the gas is dissolved in the liquid.

If necessary, a reinforcing ring that is disposed at the plurality of blades 8 may be used. The mixer may also be used as a static liquid-liquid mixer that mixes liquids having different physical properties (such as specific gravity, concentration, temperature, and viscosity) as a result of supplying the liquids from the gas supplying portion 16. Alternatively, the mixer may be used as a static gas-gas mixer that mixes gases as a result of supplying the gases from the liquid introducing portions 15.

Figure 8:
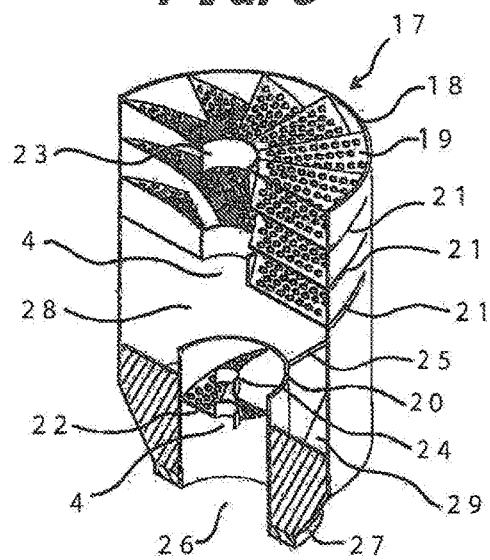
FIG. 8 is a vertical sectional perspective view of a center in a right side view of a static gas-liquid mixer, which is an application product of the mixing element according to the embodiment of the present invention.

FIG. 8 is a vertical sectional perspective view of a center in a right side view of a static gas-liquid mixer 17 including spiral blades 19 that are disposed at a tube wall portion of a passage tube 18 of the mixing element 1 according to the embodiment of the present invention. The static gas-liquid mixer 17, which is an application product according to the present invention, includes, as primary elements, the cylindrical passage tube 18 through which a gas-liquid multiphase flow moves and that is provided with the plurality of blades 19, and an inner cylindrical tube 20 that supplies pressurized gas at a lower portion of the passage tube 18.

The gas-liquid mixer 17 is formed by joining the passage tube 18 and blade edge portions 21 of the spiral blades 19 at a top portion thereof. The inner cylindrical tube 20 is formed by joining a plurality of spiral blades 22 to a top portion thereof. Each blade 19 in the passage tube 18 and each blade 22 in the inner cylindrical tube 20 are formed from a porous body having many perforations.

A reinforcing ring 23 is disposed in a central portion of the blades 19, and a reinforcing ring 24 is disposed in a central portion of the blades 22. A central-portion-side edge of each blade 19 is joined to an outer peripheral surface of the reinforcing ring 23, and a central-portion-side edge of each blade 22 is joined to an outer peripheral surface of the reinforcing ring 24. The passage tube 18 and the inner cylindrical tube 20 are supported by joining a plurality of supporting ribs 25 thereto. A gas supplying portion 26 of the inner cylindrical tube 20 is formed by joining a flange 27 thereto. A space portion 28 is formed by disposing lower end portions of the blades 19 at the passage tube 18 and an upper end portion of the inner cylindrical tube 20 apart from each other. A plurality of liquid introducing portions 29 that introduce surrounding liquid are formed below the space portion 28. Pressurized gas that is injected from the inner cylindrical tube 20 and liquid that is introduced from the plurality of liquid introducing portions 29 merge at the space portion 28, and generate a multiphase flow.

The static gas-liquid mixer 17, which is an application product according to the present invention, is used as a diffusing cylinder. The diffusing cylinder is disposed at a bottom portion of an aeration tank, and gas is injected into the space portion 28 through the plurality of blades 22 that internally contact the inner cylindrical tube 20. Injection flow of the gas that is injected at a high speed includes a spiral flow along the spiral blades 22, a straight flow along the central portion of the plurality of blades 22, and a divided flow formed by division by perforations in the blades 22. Oscillation phenomena is stimulated. It is desirable that the injection speed of the gas that is injected at a high speed be in the range of 5 to 500 m/s.

Further, by an air lift effect that occurs due to the injection flow of the pressurized gas that is injected upward at a high speed from a top portion of the inner cylindrical tube 20, surrounding liquid is introduced into the space portion 28 in the passage tube 18 from the liquid introducing portions 29. In the space portion 28, the gas and the liquid generate a gas-liquid multiphase flow. Then, while the gas-liquid multiphase flow moves in parallel upward in a mixing portion of the diffusing cylinder, as a result of division, rotation, merging, and shearing action and the oscillation phenomenon of excited gas, the gas-liquid multiphase flow is mixed/agitated and refined, so that the gas is dissolved in the liquid.

For example, the shape of the reinforcing ring 23, disposed at the plurality of blades 19, the length of the reinforcing ring 23 in an axial direction, and the number of reinforcing rings 23 are selected as appropriate. For example, the shape of the reinforcing ring 24, disposed at the plurality of blades 22, the length of the reinforcing ring 24 in an axial direction, and the number of reinforcing rings 24 are selected as appropriate. The mixer may be used as a static liquid-liquid mixer in which liquids are supplied from the gas supplying portion 26. Alternatively, the mixer may be used as a static gas-gas mixer that mixes gases as a result of supplying the gases from the liquid introducing portions 29. Center-side edges of the blades 19 may be disposed so as to extend through the reinforcing ring 23, and center-side edges of the blades 22 may be disposed so as to extend through the reinforcing ring 24. This changes the flow of the fluids from a straight flow to a spiral flow, and further increases mixing efficiency.

A method for manufacturing the mixing element 1 includes the steps of forming a fan-shaped blade by a cutting operation by a laser processor on the basis of a development showing a fan shape of the blade, a perforation of the blade, and a perforation position on the blade; forming the blade cut into the fan shape into a spiral blade by using a mold; forming an opening section in a tube wall portion of a passage tube by the laser processor so as to have substantially the same shape as a spiral blade edge portion of the blade; disposing the spiral blade in the opening section of the tube wall portion of the passage tube; and joining an outer peripheral surface of the passage tube and the blade edge portion by the laser processor. Formation into a fan shape, formation of an opening section, and welding are performed by using the laser processer, and mixing elements 1 are successively manufactured under automatic control.

A method for manufacturing the mixing element 1 includes the steps of forming a plate member having a rectangular shape or a trapezoidal shape as a result of a dividing and a spreading process in a vertical direction (longitudinal direction) in which a cylindrical passage tube is formed; forming a plurality of openings in a thickness direction of the plate member by a laser processor so as to have substantially the same shape as a spiral blade edge portion; forming the cylindrical passage tube by rolling up the plate member having the openings and by joining sections defined by straight lines or oblique lines to each other; inserting and disposing the spiral blade edge portion into an opening section of the passage tube; and joining the blade edge portion and an outer peripheral surface of the passage tube by using the laser processor. Formation of openings in the passage tube (plate member) that has been spread on a plane so as to have substantially the same shape as the blade edge portion, formation into a fan shape, formation of an opening section, welding, etc., are performed by using the laser processer, and mixing elements 1 are successively manufactured.

Figure 9:
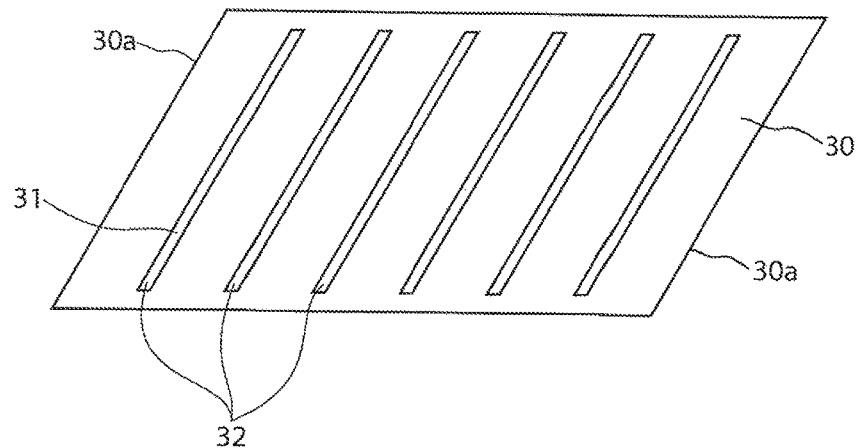
FIG. 9 is a plan view of a plate member for forming the cylindrical passage tube used in the mixing element according to the embodiment of the present invention.

FIG. 9 is a plan view of a plate member 30 for forming the cylindrical passage tube 2 used in the mixing element 1.

The plate member 30 has a rectangular shape defined by two opposing sides that are parallel to each other. The shape of the plate member 30 is not limited to a parallelogrammic shape. The shape of the plate member 30 may be a rectangular shape or a trapezoidal shape. The plate member 30 includes an opening section 32 having a plurality of openings 31 having the same shape as the blade edge portions 5.

The openings 31 are disposed at equal intervals so as to be parallel to sides of the plate member 30 in a lateral direction. The plate member 30 is formed by cutting a commercially available regular-size material having a predetermined plate thickness and predetermined dimensions by using, for example, a laser welder. The shape of the plate member 30 is determined on the basis of a development of a spiral blade.

Figure 10:
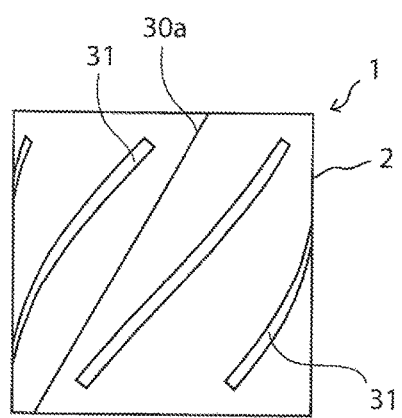
FIG. 10 is a front view of the cylindrical passage tube used in the mixing element according to the embodiment of the present invention.

FIG. 10 is a front view of the cylindrical passage tube 2 used in the mixing element 1 and formed by joining end portions of the plate member 30 that has been rolled up in a longitudinal direction.

The passage tube 2 shown in FIG. 10 is formed by rolling up the plate member 30 shown in FIG. 9 in a longitudinal direction with a bending roller, and welding the end portions (sections) of the plate member 30 in a lateral direction. After the end portions of the passage tube 2 have been welded, uneven portions on the surface of the passage tube 2 are flattened by the bending roller. Thereafter, the spiral blade 3 is joined to the opening section 31 by, for example, welding, bonding, or deposition from the outside of the passage tube 2, to form the mixing element 1.

This makes it possible to mass-produce mixing elements 1 of high quality at low manufacturing costs.

What is claimed is:

1. A method for manufacturing a mixing element, comprising the steps of:
    forming a fan-shaped blade by a cutting operation by a laser processor on the basis of a development showing a fan shape of the blade, a perforation of the blade, and a perforation position on the blade;
    forming the blade cut into the fan shape into a spiral blade by using a mold;
    forming an opening section in a tube wall portion of a passage tube by the laser processor so as to have substantially the same shape as a blade edge portion of the spiral blade;
    disposing the blade edge portion of the spiral blade in the opening section of the tube wall portion of the passage tube; and
    joining the tube wall portion of the passage tube and the blade edge portion of the spiral blade disposed in the opening section of the tube wall portion, by the laser processor.

2. A method for manufacturing a mixing element, comprising the steps of:
    forming a rectangular plate member for forming a cylindrical passage tube;
    forming an opening section in the plate member by using a laser processor, the opening section having a plurality of openings having substantially the same shape as a blade edge portion of a spiral blade;
    forming the cylindrical passage tube by rolling up the plate member including the opening section and by joining end portions of the plate member; and
    inserting the blade edge portion of the spiral blade into the opening section of the passage tube and joining the blade edge portion of the spiral blade, inserted into the opening section of the passage tube, and an outer peripheral surface of the passage tube, by using the laser processor.

\* \* \* \* \*